United States Patent [19]

Nakamura et al.

[11] Patent Number: 5,798,809
[45] Date of Patent: Aug. 25, 1998

[54] LIQUID CRYSTAL DISPLAY PANEL

[75] Inventors: Kimiaki Nakamura; Yoshio Koike, both of Kawasaki, Japan

[73] Assignee: Fujitsu Limited, Kawasaki, Japan

[21] Appl. No.: 774,755

[22] Filed: Dec. 30, 1996

[30] Foreign Application Priority Data

Aug. 16, 1996 [JP] Japan ............................ 8-216384

[51] Int. Cl.⁶ .......................... G02F 1/1335; C09K 19/60
[52] U.S. Cl. ..................... 349/119; 349/113; 349/121; 349/106; 349/165
[58] Field of Search .......................... 349/113, 119, 349/121, 106, 165

[56] References Cited

U.S. PATENT DOCUMENTS

| | | | |
|---|---|---|---|
| 3,900,248 | 8/1975 | Nagasaki | 349/165 |
| 4,093,356 | 6/1978 | Bigelow | 349/117 |
| 4,398,805 | 8/1983 | Cole | 349/117 |
| 4,492,432 | 1/1985 | Kaufmann et al. | 349/117 |
| 4,674,841 | 6/1987 | Buzuk | 349/117 |

FOREIGN PATENT DOCUMENTS 7333600  12/1995  Japan.

*Primary Examiner*—William L. Sikes
*Assistant Examiner*—Julie Ngo
*Attorney, Agent, or Firm*—Greer, Burns & Crain, Ltd.

[57] ABSTRACT

A liquid crystal display panel including a guest-host type liquid crystal layer and a reflecting plate. A polarized light rotating member is arranged between the liquid crystal layer and the reflecting plate for rotating a vibrating plane of an incident polarized light to reduce a dispersion of states of polarization of light regarding wavelength. The polarized light rotating member preferably comprises first and second superimposed linear phase plates. The $\Delta$nd of the first linear phase plates located on the side of the liquid crystal layer from the second phase plate is approximately $\lambda_0/2$ and the $\alpha$nd of the second linear phase plate is approximately $\lambda_0/4$.

19 Claims, 9 Drawing Sheets

LIQUID CRYSTAL DISPLAY PANEL

BACKGROUND OF THE INVENTION

1. Field of the Invention

The present invention relates to a reflective-type liquid crystal display panel capable of providing a high contrast and a bright display.

2. Description of the Related Art

Recently, liquid crystal display panels have been used for display devices of information apparatuses such as personal computers. With the development of portable information apparatuses, liquid crystal display panels which consume less power during use are required. Since reflective-type liquid crystal display panels do not use a backlight, it is possible for these devices to satisfy the requirement for less power consumption. One reflective-type liquid crystal display panel is a guest-host (GH) type liquid crystal display panel which has a dichroic dye contained in the liquid crystal layer.

In guest-host type liquid crystal display panel, the liquid crystal is homogeneously oriented in a particular direction, and the dichroic dye is oriented depending on the orientation direction of the liquid crystal. An incident polarized light is absorbed by the dichroic dye to produce a black display when the liquid crystal molecules are substantially parallel to the surfaces of the substrates of the liquid crystal cell, and the incident polarized light can pass through the liquid crystal molecules and the dichroic dye to produce a white display when the liquid crystal molecules are substantially perpendicular to the surfaces of the substrates of the liquid crystal cell.

However, when the liquid crystal molecules are substantially parallel to the surfaces of the substrates, the dichroic dye can absorb the incident polarized light having a vibrating plane parallel to the orientation direction of the liquid crystal, but the dichroic dye cannot absorb the incident polarized light having a vibrating plane perpendicular to the orientation direction of the liquid crystal. Therefore, in the liquid crystal display panel which does not use a polarizer, it is necessary to arrange such that the dichroic dye can absorb the incident polarized light having a vibrating plane perpendicular to the orientation direction of the liquid crystal.

For this purpose, for example, Japanese Unexamined Patent Publication (Kokai) No. 7-333600 discloses a liquid crystal display panel including a λ/4 plate arranged between the liquid crystal layer and the reflecting plate, as a polarized light rotating member. In this case, an incident polarized light having a vibrating plane parallel to the orientation direction of the liquid crystal is absorbed by the dichroic dye. The incident polarized light having a vibrating plane perpendicular to the orientation direction of the liquid crystal is also absorbed by the dichroic dye in the following manner; an incident polarized light first passes through the dichroic dye and is returned to the dichroic dye after the vibrating plane of the incident polarized light is rotated 90 degrees by the polarized light rotating member, with the result that the incident polarized light is absorbed by the dichroic dye. Therefore, all the incident polarized light can be absorbed, so it is possible to produce an image with a higher contrast.

The λ/4 plate used as a polarized light rotating member can rotate an incident polarized light having a particular wavelength. However, the refractive index of the λ/4 plate generally changes depending on wavelength, and the λ/4 plate does not function as an exact λ/4 plate if a polarized light having a wavelength different from the particular wavelength is made incident to the λ/4 plate. Therefore, when natural light is used, the amount of rotation of the vibrating plane of a part of the light passing through the λ/4 plate varies. That is, a dispersion of states of polarization of light regarding wavelength occurs. If the amount of rotation of the incident polarized light varies beyond an allowable value, it can be said that the polarized light is no better absorbed by the dichroic dye, and the light leaks and emerges from the liquid crystal layer even in the black display condition. Therefore, a problem arises in that the display surface is undesirably colored and a contrast is reduced.

SUMMARY OF THE INVENTION

The object of the present invention is to provide an improved liquid crystal display panel which can solve the problem of the display surface being undesirably colored and a contrast being reduced.

According to the present invention, there is provided a liquid crystal display panel comprising a pair of spaced apart substrates, a liquid crystal layer arranged between the substrates and having a dichroic dye contained therein, a reflecting plate, and a polarized light rotating member arranged between the liquid crystal layer and the reflecting plate for rotating a vibrating plane of an incident polarized light to reduce a dispersion of states of polarization of light regarding wavelength. In particular, the polarized light rotating member is arranged such that it can reduce a dispersion of states of polarization of light regarding wavelength, rather than a case where a single λ/4 plate is used. Also, it is preferable that the liquid crystal layer comprises a homogeneously oriented liquid crystal layer.

Preferably, the polarized light rotating member comprises first and second superimposed linear phase plates. One of the first and second linear phase plates located on the side of the liquid crystal layer from the other phase plate may be the one constructed so that a dispersion of states of polarization of light regarding wavelength occurs, and the other linear phase plates may be the one which compensates for the dispersion of states of polarization of light occurring at said one linear phase plate to reduce the dispersion of states of polarization of light.

In this case, preferably, the $\Delta$nd of the first linear phase plate located on the side of the liquid crystal layer from the second phase plate is approximately $\lambda_0/2$, and the $\Delta$nd of the second linear phase plate is approximately $\lambda_0/4$, and the $\Delta$nd of the other linear phase plate is approximately $\lambda_0/4$, where $\lambda_0$ is a central value of a transmission spectrum of a picture element, $\Delta$n is birefringence of a linear phase plate, and d is a thickness of a linear phase plate.

Also, in this case, preferably, when a starting line is defined in a direction parallel or perpendicular to an orientation direction of the liquid crystal layer, the arrangement is such that an angle ($\Delta\phi_{f1}$) between the starting line and a slow axis of the first linear phase plate taken in the first direction from starting line is in the range from 5 to 25 degrees, and such that an angle ($\lambda\phi_{f2}$) between the starting line and a slow axis of the second linear phase plate taken in the first direction from starting line is in the range from $(2\Delta\phi_{f1}+40)$ to $(2\Delta\phi_{f1}+50)$ degrees.

Also, preferably, the polarized light rotating member comprises a phase plate having a twisted optical axis. In this case, the twisting angle of the optical axis of the phase plate is equal to or smaller than 45 degrees, and $\Delta$nd of the phase plate is equal to or smaller than 250 nm.

Also, preferably, the polarized light rotating member comprises portions corresponding to color picture elements, the portions of the polarized light rotating member having different Δnd values, where Δn is birefringence of the respective one of the portions of the polarized light rotating member, and d is a thickness of the respective one of the portions of the polarized light rotating member. In this case, the polarized light rotating member preferably comprises a linear phase plate having said portions, and the Δnd of the respective one of the linear phase plates is approximately λ/4, where λ is a central value of a transmission spectrum of respective one of the color picture elements. Also, the liquid crystal display panel may include a color filter having color portions different for every picture element, or a color filter having a continuous transmission spectrum.

Also, preferably, the polarized light rotating member and the reflecting plate are arranged inside the substrates. The polarized light rotating member comprises a linear phase plate having different Δnd values for every color picture element, and at least one of a thickness (d) of the linear phase plate, Δn of the linear phase plate, and a pretilt angle of an optical axis relative to the substrates is changed in order to change Δnd of the linear phase plate. Also, the liquid crystal layer comprises a phase plate made from one of a UV curable liquid crystal and a thermotropic liquid crystal.

BRIEF DESCRIPTION OF THE DRAWINGS

The present invention will become more apparent from the following description of the preferred embodiments, with reference to the accompanying drawings in which.

DESCRIPTION OF THE PREFERRED EMBODIMENTS

Figure 1:
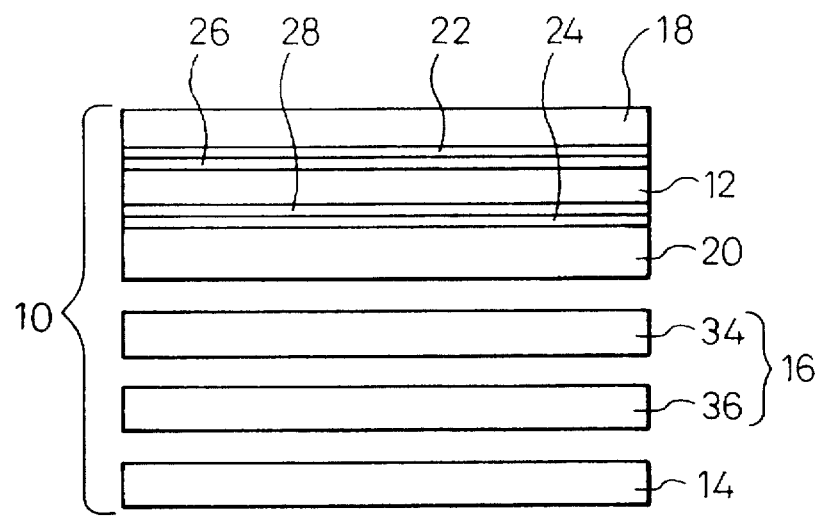
FIG. 1 is a diagrammatic cross-sectional view of a liquid crystal display panel according to the first embodiment of the present invention.

FIG. 1 is a diagrammatic cross-sectional view of a liquid crystal display panel according to the first embodiment of the present invention. The liquid crystal display panel 10 includes a guest-host (GH) type liquid crystal layer 12 having dichroic dye contained therein, a reflecting plate 14, and a polarized light rotating means 16 arranged between the liquid crystal layer 12 and the reflecting plate 14.

The liquid crystal layer 12 is inserted between a pair of spaced apart transparent substrates 18 and 20. A transparent electrode layer 22 and an orientation layer 26 are provided inside the substrate 18, and a transparent electrode layer 24 and an orientation layer 28 are provided inside the substrate 20.

Figure 3:
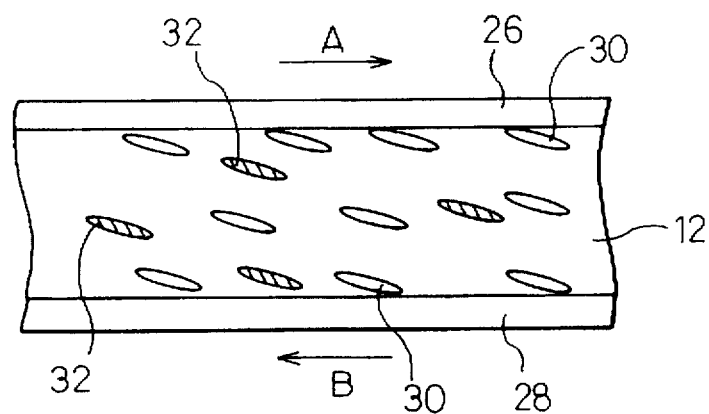
FIG. 3 is a diagrammatic cross-sectional view of the guest-host type liquid crystal display device.

As shown in FIG. 3, the liquid crystal layer 12 includes liquid crystal molecules 30 and a dichroic dye 32. The orientation layer 26 is treated with a rubbing operation in the direction of arrow A, and the orientation layer 28 is treated with a rubbing operation in the direction of arrow B. The rubbing direction A and the rubbing direction B are parallel to and opposite from each other. Therefore, the liquid crystal molecules 30 are homogeneously oriented in the direction parallel to the rubbing directions A and B, and a pretilt appears. The particles of dichroic dye 32 are oriented depending on the orientation direction of the liquid crystal molecules 30. For example, the liquid crystal can be LA-103/ZLI-4792 distributed by Mitsui Chemical Corporation, which is inserted in an empty cell having substrates 18 and 20 having orientation layers 26 and 28 and a gap thickness of 8 µm.

The polarized light rotating means 16 comprises first and second superimposed linear phase plates 34 and 36. For example, an NRF phase plate distributed by Nitto Denko Corporation can be used for the first and second linear phase plates 34 and 36. The first linear phase plate 34 has a Δnd of 275 nm, and the second linear phase plate 36 has a Δnd of 138 nm. S type reflecting plates distributed by Nitto Denko Corporation can be used for the reflecting plate 14.

In this example, the Δnd of the first linear phase plate 34 located on the side of the liquid crystal layer 12 from the second phase plate 36 is approximately $\lambda_0/2$, and the Δnd of the second linear phase plate 36 is approximately $\lambda_0/4$ where $\lambda_0$ is a central value of a transmission spectrum of a picture element, Δn is birefringence of a linear phase plate, and d is a thickness of a linear phase plate. In this combination, the first linear phase plate 34 located on the side of the liquid crystal layer 12 may be the one constructed so that a dispersion of states of polarization of light regarding wavelength occurs, and the second linear phase plate 36 may be the one which compensates for the dispersion of states of polarization of light occurring at the first linear phase plate 34 to reduce the dispersion of states of polarization of light.

Figure 2:
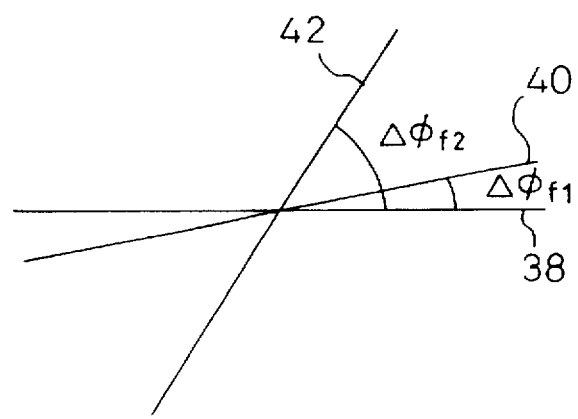
FIG. 2 is a view illustrating the relationship between the orientation direction of the liquid crystal and the slow axes of the linear phase plates of FIG. 1.

FIG. 2 shows the relationship between the orientation direction of the liquid crystal layer 12 and the slow axes of the linear phase plates 34 and 36. A starting line 38 is defined to be a direction parallel or perpendicular to an orientation direction of the liquid crystal layer 12. An angle between the starting line 38 and a slow axis 40 of the first linear phase plate 34 taken in the first direction from starting line 38 is represented by $\Delta\phi_{f1}$. An angle between the starting line 38 and a slow axis 42 of the second linear phase plate 42 taken in the first direction from starting line 38 is represented by $\Delta\phi_{f2}$. The first direction is defined so that the angle $\Delta\phi_{f1}$ between the starting line 38 and the slow axis 40 of the first linear phase plate 34 is an acute angle.

The angle $\Delta\phi_{f1}$ between the starting line 38 and the slow axis 40 of the first linear phase plate 34 is preferably in the range of 15±10 degrees, i.e., in the range from 5 to 25 degrees. Also, the angle $\Delta\phi_{f2}$ between the starting line 38 and the slow axis 42 of the second linear phase plate 42 is in the range of $2\Delta\phi_{f1}$+45±5 degrees, i.e., in the range from ($2\Delta\phi_{f1}$+40) to ($2\Delta\phi_{f1}$+50) degrees.

Figure 4:
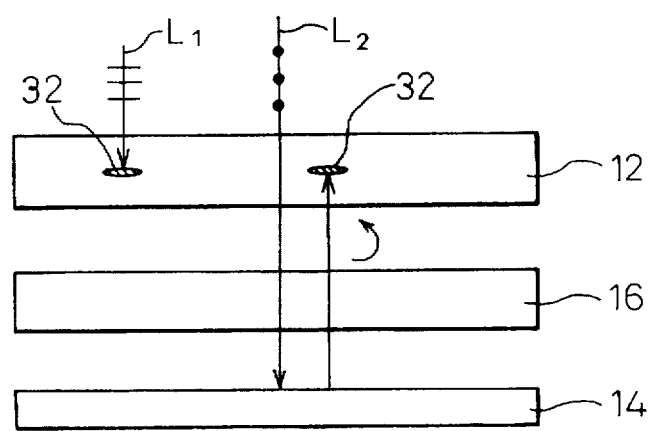
FIG. 4 is a view illustrating the absorption of an incident polarized light by the guest-host type liquid crystal layer.

As shown in FIG. 4, when the liquid crystal molecules 30 are substantially parallel to the surfaces of the substrates 26 and 28, an incident polarized light $L_1$ having a vibrating plane parallel to the orientation direction of the liquid crystal is absorbed by the dichroic dye 32. The incident polarized light $L_2$ having a vibrating plane perpendicular to the orientation direction of the liquid crystal is not absorbed by the dichroic dye 32 and passes through the liquid crystal layer 12 toward the polarized light rotating means 16. The incident polarized light $L_2$ is reflected by the reflecting plate 14 toward the liquid crystal layer 12, and the vibrating plane of the incident polarized light $L_2$ is rotated approximately 90 degrees while it twice passes through the polarized light rotating means 16. Therefore, the incident polarized light $L_2$ is then absorbed by the dichroic dye 32 since the vibrating plane of the incident polarized light $L_2$ is rotated 90 degrees. Therefore, when the liquid crystal molecules 30 are substantially parallel to the surfaces of the substrates 26 and 28 (i.e., when the voltage is not applied), it is possible to establish a black display. In addition, when the liquid crystal molecules 30 are substantially perpendicular to the surfaces of the substrates 26 and 28 (i.e., when the voltage is applied), the incident polarized light passes through the liquid crystal molecules 30 and the dichroic dye 32 and it is possible to establish a white display.

In the embodiment, the linear polarized light passes through the first linear phase plate 34 as a linear polarized light with its vibrating plane rotated. The linear polarized light passes through the second linear phase plate 36 while the linear polarized light is converted into a circularly polarized light, and the circularly polarized light reflected by the reflecting plate 14 passes through the second linear phase plate 36 while the circularly polarized light is converted into the linear polarized light. Thus, the linear polarized light with its vibrating plane rotated is made incident to the liquid crystal layer 12. Therefore, the dispersion of states of polarization of light is reduced, by reversely compensating, at the second linear phase plate 36, for the dispersion of states of polarization of light occurred at the first linear phase plate 34.

Figure 5:
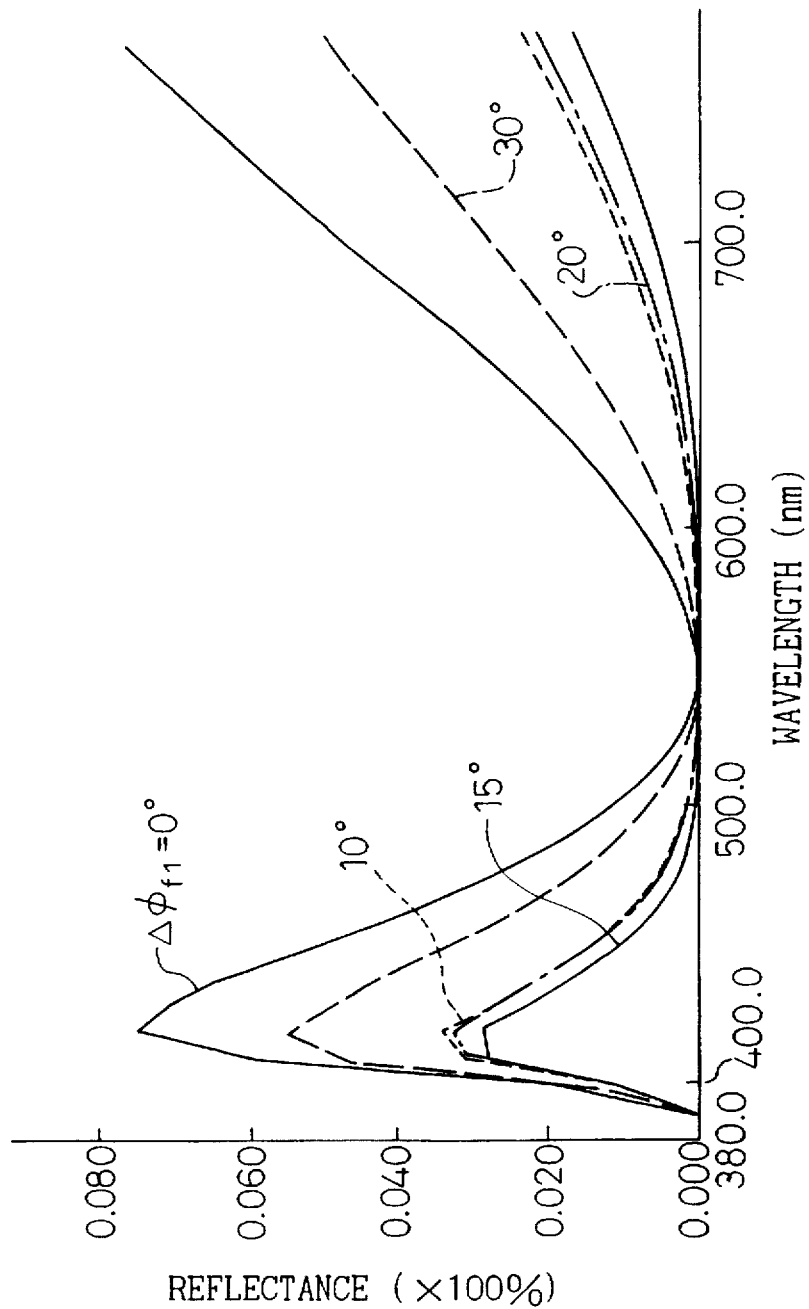
FIG. 5 is a view illustrating the relationship between the reflectance of the guest-host type liquid crystal display panel and wavelength when the polarized light rotating member of FIG. 1 is used.

FIG. 5 shows a reflectance distribution (reflectance spectrum) when the angle $\Delta\phi_{f1}$ between the starting line 38 and the slow axis 40 of the first linear phase plate 34 is changed. It will be apparent that as much incident light is absorbed as possible and the reflectance is as low as possible, when it is desired to produce a black display.

In FIG. 5, the curve of $\Delta\phi_{f1}$=0 degree corresponds to the prior art case where the first linear phase plate 34 is not provided and the second linear phase plate 34 is arranged at 45 degrees. In this case, the reflectance can be minimized at a particular wavelength (for example, at 550 nm) but the reflectance becomes larger as the wavelength becomes larger or smaller than the particular wavelength. That is, the dispersion of states of polarization of light regarding the wavelength is large.

In the curve of the angle $\Delta\phi_{f1}$=15 degrees, a change of the reflectance with respect to a change of the wavelength, i.e., the dispersion of states of polarization of light regarding the wavelength becomes minimum. It has been found that as the angle $\Delta\phi_{f1}$ is greater or smaller than 15 degrees, a change of the reflectance with respect to a change of the wavelength, i.e., the dispersion of states of polarization of light regarding the wavelength becomes larger. It has been found that a satisfactory result is obtained when the angle $\Delta\phi_{f1}$ is in the range of 15±10 degrees. In addition, it has been found that a most preferable result is obtained when the angle $\Delta\phi_{f2}$ between the starting line 38 and the slow axis 42 of the second linear phase plate 42 is at $2\Delta\phi_{f1}$+45 degrees, and a satisfactory result is obtained when the angle $\Delta\phi_{f2}$ is in the range of $2\Delta\phi_{f1}$+45±5 degrees.

Figure 6:
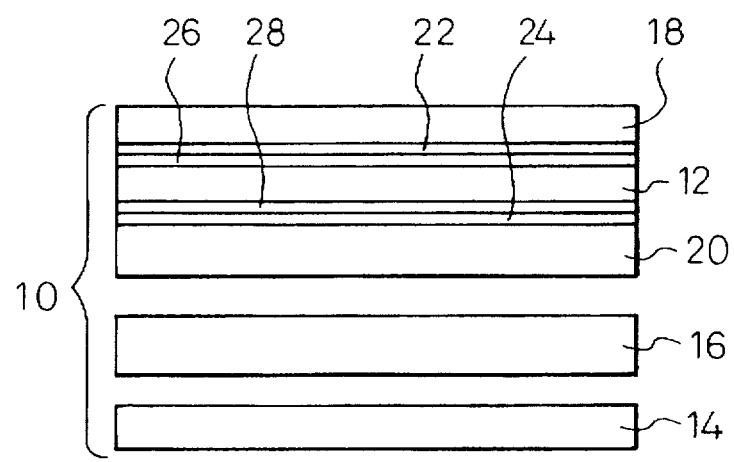
FIG. 6 is a diagrammatic cross-sectional view of a liquid crystal display panel according to the second embodiment of the present invention.

FIG. 6 shows another embodiment of the present invention. The liquid crystal display panel 10 includes a guest-host (GH) type liquid crystal layer 12 having a dichroic dye contained therein, a reflecting plate 14, and a polarized light rotating means 16 arranged between the liquid crystal layer 12 and the reflecting plate 14. The arrangement of the polarized light rotating means 16 is different from that of the previous embodiment.

Figure 7:
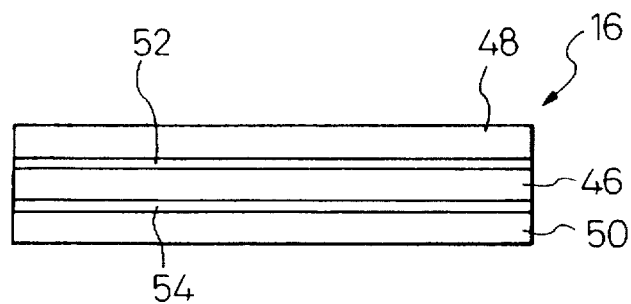
FIG. 7 is a view illustrating an example of the polarized light rotating member comprising a phase plate having a twisted optical axis of FIG. 6.

The polarized light rotating means 16 comprises a phase plate having a twisted optical axis. An example of the polarized light rotating means 16 comprising the phase plate having a twisted optical axis is shown in FIG. 7. This phase plate comprises a pair of spaced apart substrates 48 and 50 with a gap 2 μm therebetween and a liquid crystal layer 46 such as ZLI-4792 distributed by Merk Corporation inserted between the substrates 48 and 50. The substrates 48 and 50 have respective orientation layers 52 and 54 which are rubbed in the directions at 45 degrees from each other. It is preferable that the twisting angle of the optical axis of the phase plate 16 is equal to or smaller than 45 degrees, and the Δnd of the phase plate 16 is equal to or smaller than 250 nm.

Another example of the polarized light rotating means 16 comprising a phase plate having a twisted optical axis is, for example, Nisseki LC Film distributed by Japan Petrochemical Corporation.

Figure 8:
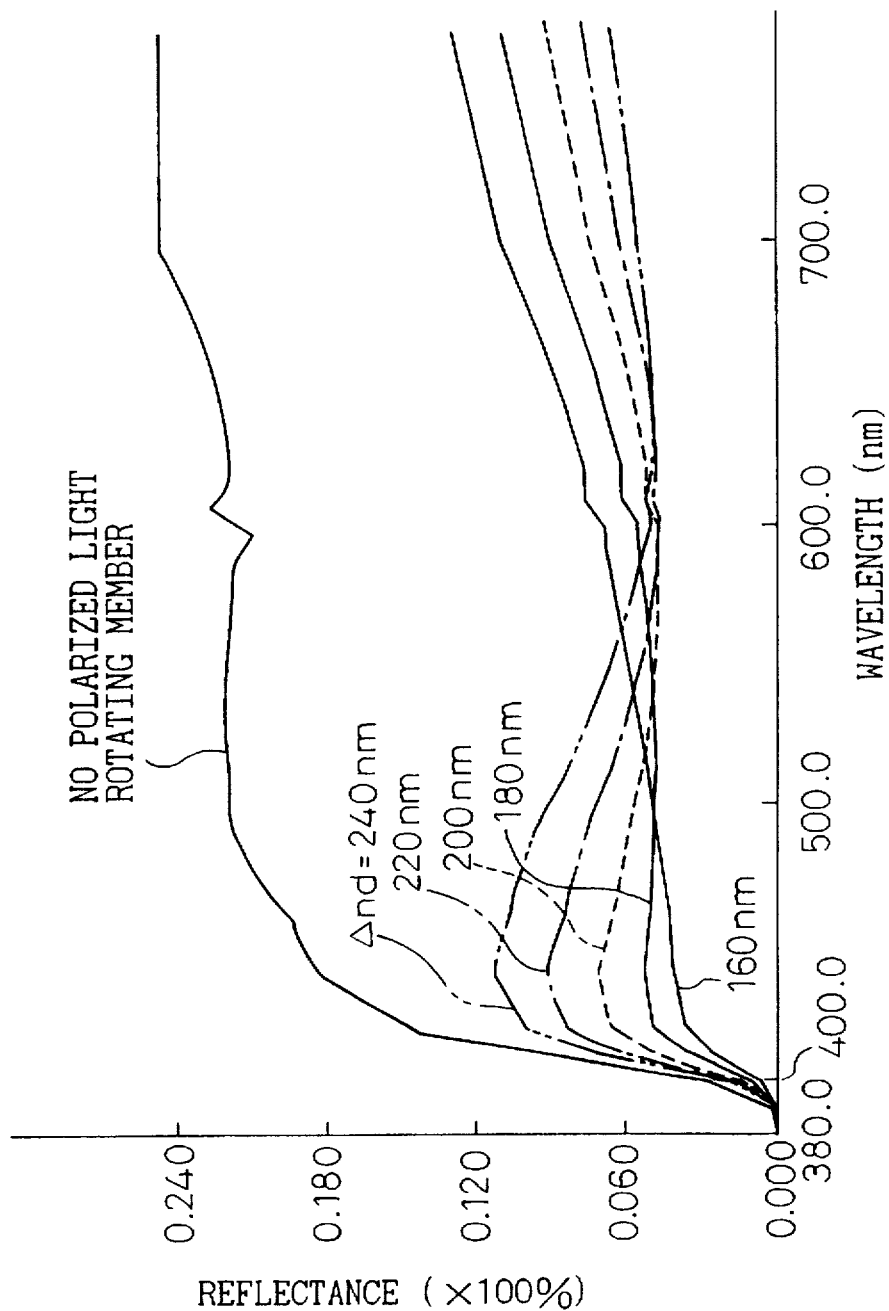
FIG. 8 is a view illustrating the relationship between the reflectance of the guest-host type liquid crystal display panel and the wavelength, using Δnd as a parameter, when the polarized light rotating member of FIG. 6 is used.
Figure 9:
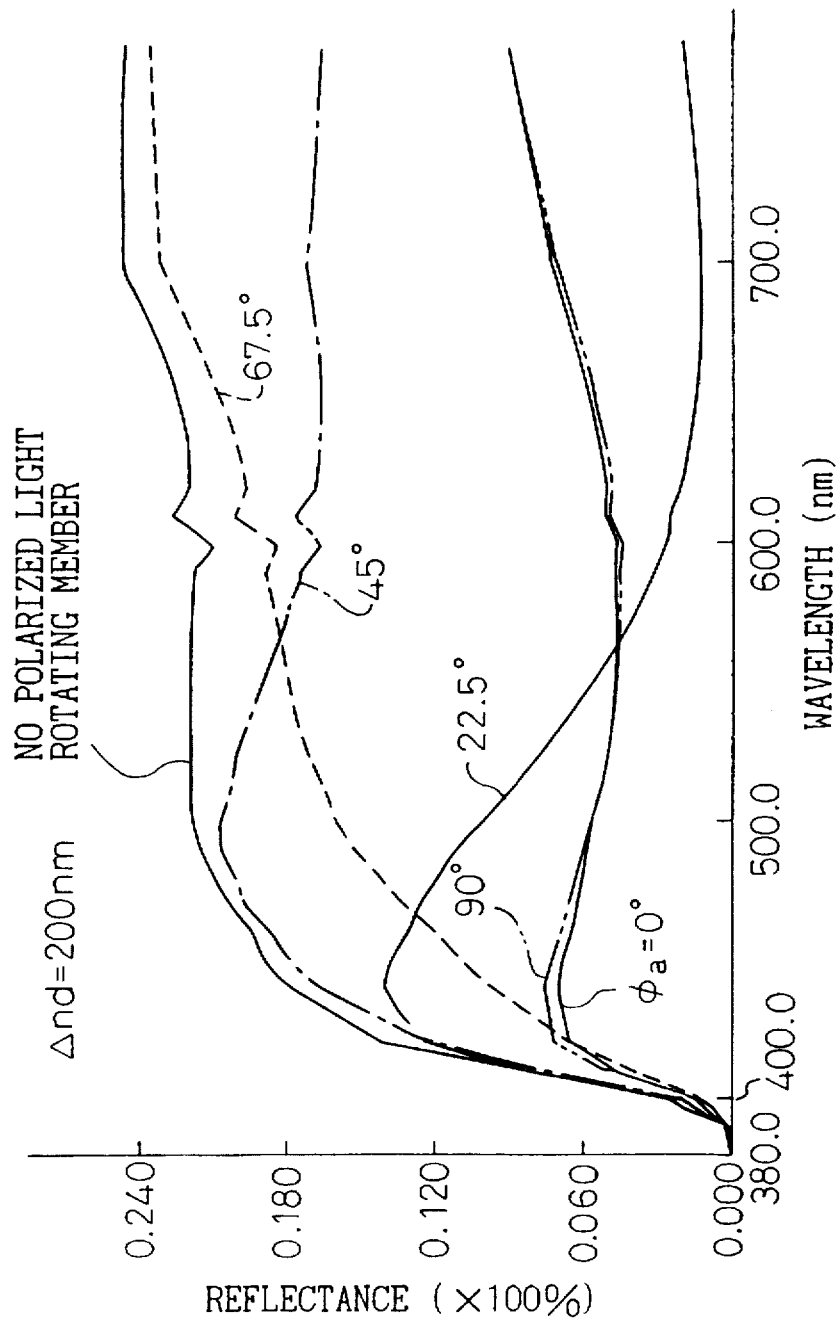
FIG. 9 is a view illustrating the relationship between the reflectance of the guest-host type liquid crystal display panel and the wavelength, using a twist angle as a parameter, when the polarized light rotating member of FIG. 6 is used.

FIGS. 8 and 9 show the result of a test when a phase plate having a twisted optical axis is used as the polarized light rotating means 16. It has been found from FIG. 8 that a preferable result is obtained when the Δnd of the film is lower than 250 nm, and that the reflectance spectrum has a substantially flat characteristic when the Δnd of the film is approximately 200 nm. As shown in FIG. 9, when the Δnd is 200 nm and the angle φa between the orientation direction of the liquid crystal molecules of the liquid crystal layer 12 and a starting line of the twist of the phase plate 16 on the side near the liquid crystal layer 12 is zero (i.e., when the orientation direction of the liquid crystal layer 12 is parallel to the starting line of the twist of the phase plate 16), the reflectance becomes minimum.

Figure 10:
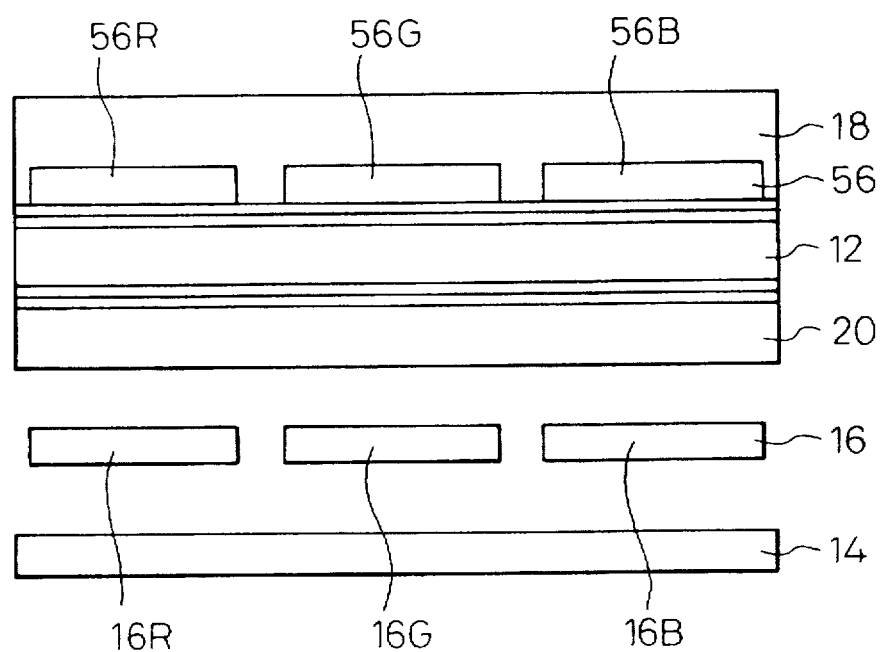
FIG. 10 is a diagrammatic cross-sectional view of a liquid crystal display panel according to the third embodiment of the present invention.

FIG. 10 shows a further embodiment of the present invention. The liquid crystal display panel includes a guest-host type liquid crystal layer 12, a color filter 56, and a polarized light rotating means 16. The polarized light rotating means 16 comprises a layer of linear phase plate formed by a λ/4 plate which are divided into color portions corresponding to the wavelength of respective colors. The color filter 56 includes red filter portions 56R, green filter portions 56G, and blue filter portions 56B, and the polarized light rotating means 16 includes red linear phase plate portions 16R, green linear phase plate portions 16G, and blue linear phase plate portions 16B, corresponding to the color filter portions 56R, 56G and 56B.

The linear phase plate portions 16R, 16G, and 16B have different Δnd values, where Δn is birefringence of respective one of the linear phase plate portions 16R, 16G, and 16B, and d is a thickness of respective one of the linear phase plate portions 16R, 16G, and 16B. Each respective one of the Δnd values of the linear phase plate portions 16R, 16G, and 16B is approximately λ/4, where λ is a central value of a transmission spectrum of each respective one of the color filter portions 56R, 56G and 56B.

Figure 11:
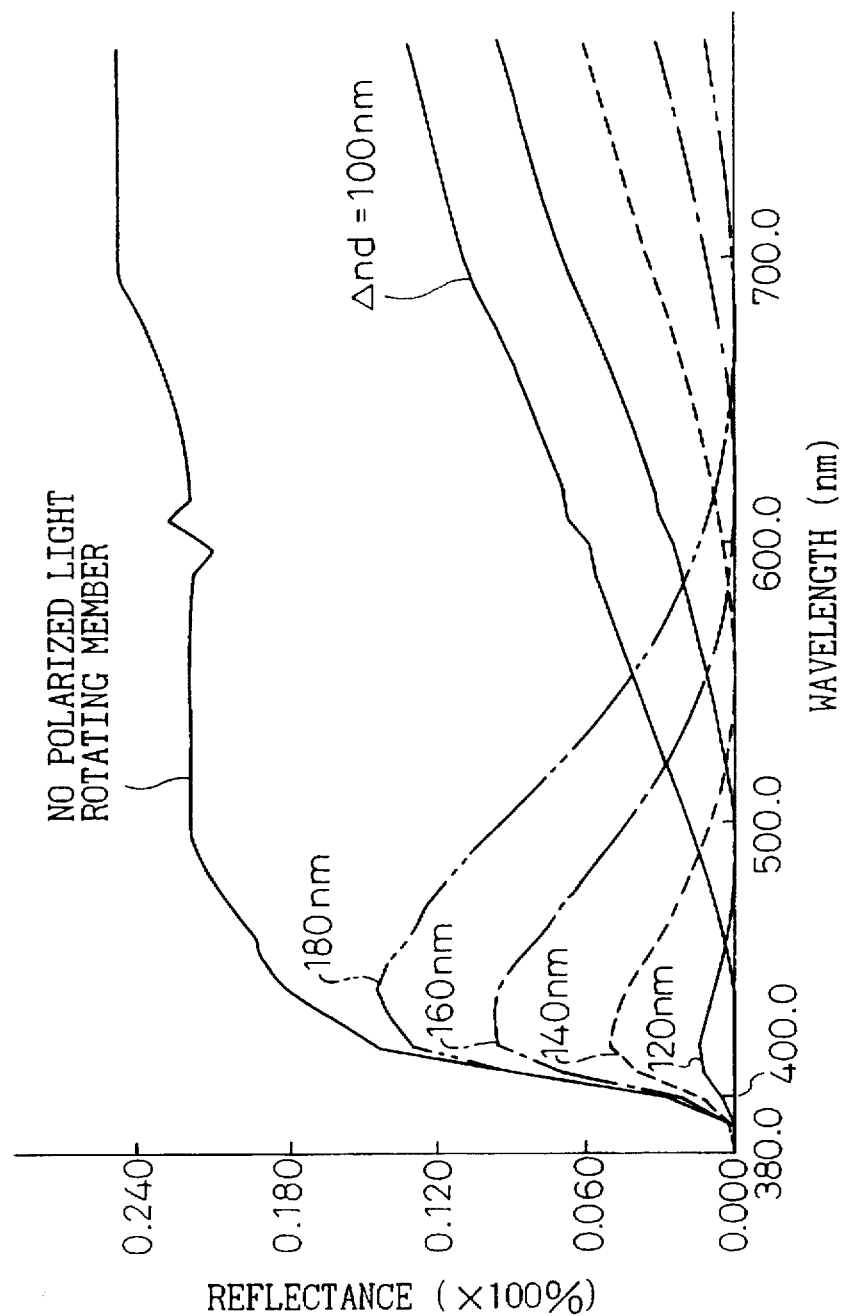
FIG. 11 is a view illustrating the relationship between the reflectance of the guest-host liquid crystal display panel and wavelength when the polarized light rotating member of FIG. 10 is used.

FIG. 11 shows the reflectance spectrum of the liquid crystal panel when the Δnd is changed. It is deemed that a central wavelength of light transmitting through the red filter portions 56R is 650 nm, a central wavelength of light transmitting through the green filter portions 56G is 550 nm, and a central wavelength of light transmitting through the blue filter portions 56B is 450 nm. The red phase plate portions 16R having a Δnd of 160 nm is suitable for the red filter portions 56R. Similarly, it is suitable that the green phase plate portions 16G have Δnd of 140 nm and the blue phase plate portions 16B have Δnd of 110 nm.

It is advisable that the color filter 56 has a continuous transmission spectrum, and that the color filter 56 does not include a color, such as magenta, having a discontinuous transmission spectrum.

While the reflecting plate 14 and the polarized light rotating means 16 are arranged outside the substrates 18 and 20 of the liquid crystal cell in the above described embodiments, it is also preferable that the reflecting plate 14 and the polarized light rotating means 16 are arranged inside the substrates 18 and 20 of the liquid crystal cell. In this case, a film of the reflecting plate 14 is formed on the transparent substrate 20 of the liquid crystal cell, and a film of the linear phase plate 16 is then formed on the reflecting plate 14. Nisseki LC Film distributed by Japan Petrochemical Corporation can be used for the linear phase plate 16.

Figure 12:
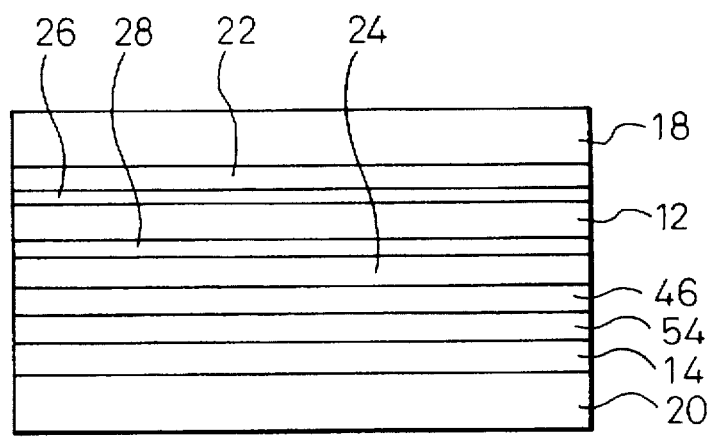
FIG. 12 is a diagrammatic cross-sectional view of a liquid crystal display panel according to the fourth embodiment of the present invention.

FIG. 12 shows another example in which the reflecting plate 14 and the polarized light rotating means 16 are arranged inside the substrates 18 and 20 of the liquid crystal cell. This embodiment uses the polarized light rotating means 16 comprising a phase plate having a twisted optical axis, shown in FIGS. 6 and 7. After forming a film of the reflecting plate 14 on the transparent substrate 20 of the liquid crystal cell, the orientation layer 54 of the polarized light rotating means 16 is formed on the reflecting plate 14. The liquid crystal layer 46 of the polarized light rotating means 16 is then applied to the orientation layer 54 and hardened. It is possible to use a UV curable liquid crystal distributed by Dainippon Ink Chemistry Corporation (Journal of the SID, Mar. 3, 1995, p139) and having an adequate amount of chiral agent contained therein, as the liquid crystal layer 46 of the polarized light rotating means 16. The orientation layer 54 of the polarized light rotating means 16 is subjected to a rubbing operation. The transparent electrode 24 and the orientation layer 28 are then formed on the liquid crystal layer 46 of the polarized light rotating means 16. The other transparent substrate 18 has the transparent electrode 22 and the orientation layer 26 formed thereon.

As a means for forming two layers of linear phase plates inside the substrates of the liquid crystal cell, it is possible to use the following method, in place of laminating two of the linear phase plates distributed by Nitto Denko Corporation. In another method, after forming a film of the linear phase plate, a UV curable and optically isotropic resin is applied to the linear phase plate and hardened, and another film of the linear phase plate is applied to the UV curable resin and hardened. There are a Nisseki LC film and a liquid crystal layer applied to a rubbed orientation layer and hardened which can be used for the film of the linear phase plate.

As a means for forming a phase plate having optimum Δnd values for every color picture element, there are the following methods; (a) a layer of UV curable liquid crystal having a first Δnd value is applied and selectively hardened for selected picture elements, and a layer of UV curable liquid crystal having a second Δn value and an identical thickness to that of the first layer is applied and selectively hardened for further selected picture elements, and a layer of UV curable liquid crystal having a third Δn value and an identical thickness to that of the first layer is applied and selectively hardened for further selected picture elements; (b) a layer of UV curable liquid crystal having a first Δnd value is applied and selectively hardened for selected picture elements, and a layer of UV curable liquid crystal having the first Δnd value and a different thickness from that of the first layer is applied and selectively hardened for further selected picture elements, and a layer of UV curable liquid crystal having the first Δnd value and a different thickness from those of the first and second layers is applied and selectively hardened for further selected picture elements; (c) the thickness of the UV curable liquid crystal is changed, by preliminary forming recesses and projections having predetermined heights on the reflecting plate 14 by an optically isotropic UV curable resin, for example; (d) when the UV curable liquid crystal is hardened, pretilts are given to the liquid crystal molecules by applying voltage or by the orientation layer. It is also possible to use a thermotropic liquid crystal, and it is possible to use the above described process. In this case, the phase plate portions having selectively different features for every color picture element are provided by photolithograpy using a resist. Also, the temperature of the liquid crystal is lowered to harden the liquid crystal.

As explained in greater detail, according to the present invention, it is possible to reduce the deviation of the states of polarization due to a difference in the wavelength, so it is possible to establish a good display which has a higher contrast and without any undesirable color, to improve the viewing capability of the liquid crystal display panel to contribute to a development of the efficiency of the liquid crystal display panel.

We claim:

1. A liquid crystal display panel comprising:
   a pair of spaced apart substrates;
   a liquid crystal layer arranged in the substrates and having dichroic dye contained therein;
   a reflecting plate; and
   a polarized light rotating member having a plurality of superimposed linear phase plates, said polarized light rotating member being arranged between the liquid crystal layer and the reflecting plate for rotating a vibrating plane of an incident polarized light to reduce a dispersion of states of polarization of light regarding wavelength.

2. A liquid crystal display panel according to claim 1, wherein the liquid crystal layer comprises a homogeneously oriented liquid crystal layer.

3. A liquid crystal display panel according to claim 1, wherein the polarized light rotating member comprises first and second superimposed linear phase plates.

4. A liquid crystal display panel according to claim 3, wherein the Δnd of the first linear phase plate located on the side of the liquid crystal layer from the second phase plate is approximately $\lambda_0/2$, and the $\Delta$nd of the second linear phase plate is approximately $\lambda_0/4$, where $\lambda_0$ is a central value of a transmission spectrum of a picture element, $\Delta$n is birefringence of a linear phase plate, and d is a thickness of a linear phase plate.

5. A liquid crystal display panel according to claim 4, wherein when a starting line is defined in a direction parallel or perpendicular to an orientation direction of the liquid crystal layer, the arrangement is such that an angle ($\Delta\phi_{f1}$) between the starting line and a slow axis of the first linear phase plate taken in the first direction from starting line is in the range from 5 to 25 degrees, and such that an angle ($\Delta\phi_{f2}$) between the starting line and a slow axis of the second linear phase plate taken in the first direction from starting line is in the range from ($2\Delta\phi_{f1}$+40) to ($2\Delta\phi_{f1}$+50) degrees.

6. A liquid crystal display panel according to claim 1, wherein the polarized light rotating member comprises a phase plate made from one of a UV curable liquid crystal and a thermotropic liquid crystal.

7. A liquid crystal display panel according to claim 1, wherein the polarized light rotating member and the reflecting plate are arranged inside the substrates.

8. A liquid crystal display panel comprising:

a pair of spaced apart substrates;

a liquid crystal layer arranged in the substrates and having dichroic dye contained therein;

a reflecting plate; and a polarized light rotating member including a phase plate having a twisted optical axis, said polarized light rotating member being arranged between the liquid crystal layer and the reflecting plate for rotating a vibrating plane of an incident polarized light to reduce a dispersion of states of polarization of light regarding wavelength.

9. A liquid crystal display panel according to claim 8, wherein the twisting angle of the optical axis of the phase plate is equal to or smaller than 45 degrees and greater than zero, and the $\Delta$nd of the phase plate is equal to or smaller than 250 nm.

10. A liquid crystal display panel according to claim 8, wherein the liquid crystal layer comprises a homogeneously oriented liquid crystal layer.

11. A liquid crystal display panel according to claim 8, wherein the polarized light rotating member and the reflecting plate are arranged inside the substrates.

12. A liquid crystal display panel according to claim 8, wherein the polarized light rotating member comprises a phase plate made from one of a UV curable liquid crystal and a thermotropic liquid crystal.

13. A liquid crystal display panel comprising:

a pair of spaced apart substrates;

a liquid crystal layer arranged in the substrates and having dichroic dye contained therein;

a reflecting plate; and a polarized light rotating member arranged between the liquid crystal layer and the reflecting plate for rotating a vibrating plane of an incident polarized light to reduce a dispersion of states of polarization of light regarding wavelength, said polarized light rotating member including portions corresponding to color picture elements, the portions of the polarized light rotating member having different $\Delta$nd values, where $\Delta$n is birefringence of respective one of the portions of the polarized light rotating member, and d is a thickness of respective one of the portions of the polarized light rotating member.

14. A liquid crystal display panel according to claim 13, wherein the polarized light rotating member comprises a linear phase plate having said portions, and the $\Delta$nd of each respective one of the linear phase plate is approximately $\lambda/4$, where $\lambda$ is a central value of a transmission spectrum of respective one of the color picture elements.

15. A liquid crystal display panel according to claims 13, further including a color filter having a continuous transmission spectrum.

16. A liquid crystal display panel according to claim 13, wherein the polarized light rotating member comprises a linear phase plate having different $\Delta$nd values for every color picture element, and at least one of a thickness (d) of the linear phase plate, the $\Delta$n of the linear phase plate, and the pretilt angle of an optical axis relative to the substrates is changed in order to change the $\Delta$nd of the linear phase plate.

17. A liquid crystal display panel according to claim 13, wherein the liquid crystal layer comprises a homogeneously oriented liquid crystal layer.

18. A liquid crystal display panel according to claim 13, wherein the polarized light rotating member and the reflecting plate are arranged inside the substrates.

19. A liquid crystal display panel according to claim 13, wherein the polarized light rotating member comprises a phase plate made from one of a UV curable liquid crystal and a thermotropic liquid crystal.

\* \* \* \* \*